United States Patent [19]

Danelski

[11] Patent Number: 5,028,076

[45] **Date of Patent: * Jul. 2, 1991**

[54] PRODUCT HAVING CONCEALED MESSAGE

[75] Inventor: James J. Danelski, New York, N.Y.

[73] Assignee: Ivy Hill Corporation

[ * ] Notice: The portion of the term of this patent subsequent to Nov. 27, 2007 has been disclaimed.

[21] Appl. No.: 453,704

[22] Filed: Dec. 20, 1989

Related U.S. Application Data

[63] Continuation-in-part of Ser. No. 366,172, Jun. 14, 1989, Pat. No. 4,972,953.

[51] Int. Cl.$^5$ .......................... B42D 15/00; B32D 3/00

[52] U.S. Cl. .................................... 283/108; 283/903; 428/203

[58] Field of Search ................ 283/108, 903; 206/459; 428/202, 203, 204, 916

[56] References Cited

U.S. PATENT DOCUMENTS

| | | | |
|---|---|---|---|
| 3,631,617 | 1/1972 | Pekko . | |
| 3,864,855 | 2/1975 | Pekko et al. . | |
| 3,900,219 | 8/1975 | D'Amato et al. . | |
| 4,057,919 | 11/1977 | Gauch et al. | 428/916 |
| 4,129,445 | 10/1978 | Carrier et al. | 428/916 |
| 4,180,929 | 1/1980 | Schultz, Jr. . | |
| 4,184,701 | 1/1980 | Franklin et al. | 283/108 |
| 4,488,646 | 12/1984 | McCorkle | 206/459 |
| 4,591,190 | 5/1986 | Clark | 283/903 |
| 4,708,369 | 11/1987 | Greig . | |
| 4,709,397 | 11/1987 | Voshall et al. | 206/459 |
| 4,718,553 | 1/1988 | Adamoli et al. . | |
| 4,738,473 | 4/1988 | Meloni et al. . | |
| 4,759,968 | 7/1988 | Janssen | 428/203 |
| 4,830,405 | 5/1989 | Di Bella | 283/903 |

*Primary Examiner*—Frank T. Yost

*Assistant Examiner*—Hwei-Siu Payer

*Attorney, Agent, or Firm*—Amster, Rothstein & Ebenstein

[57] ABSTRACT

A wagering, promotional or novelty product having a concealed message comprises a sheet having an outer surface, ink visibly disposed on the outer surface in a first pattern, and transparent film overlying at least a portion of the inked outer surface and secured to the ink on the outer surface portion in selected differentially adherent patterns, the first pattern being visible through the film. Removal of the film from the inked outer surface portion also removes the ink in one of the selected patterns to reveal a desired pattern of deinked outer surface and thereby render visible the previously concealed message.

7 Claims, 2 Drawing Sheets

PRODUCT HAVING CONCEALED MESSAGE

CROSS-REFERENCE TO RELATED APPLICATIONS

This application is a continuation-in-part of U.S. Pat. Application Ser. No. 366,172, filed June 14, 1989, now patented U.S. Pat. No. 4,972,953.

BACKGROUND OF THE INVENTION

The present invention relates to wagering, promotional or novelty products, and more particularly to such a product having a concealed message.

Promotional devices such as advertising sheets, wagering games such as lottery tickets, and novelty products such as greeting cards all desirably utilize a gimmick or technique to attract and maintain the interest of the prospective reader or user. A standard but still effective gimmick is the use of a concealed message including light-sensitive hidden messages (which are visible only under light of a particular wavelength), water-activated hidden messages (which are visible when the message is moistened with water), glow-in-the-dark hidden messages (which are visible only in darkness and after initial exposure to light), and rub-off lottery tickets (wherein the winning number or symbol is initially concealed by an opaque coating and revealed only when the coating is scratched or rubbed off, as with an eraser or coin), and the like. Where the product is a wagering card, such as the rub-off lottery ticket, in which the winning wagerer receives immediate gratification upon comparing the just revealed message with a fixedly visible message on the lottery ticket itself or elsewhere and finding a match, it is also necessary to reassure the wagerer that the person distributing the lottery tickets did not first see the concealed message and thereafter save for himself the winning tickets, while selling only the losing tickets. Light-sensitive messages, water-activated messages, glow-in-the-dark messages and similar initially concealed messages which revert to their original "concealed" condition after having once been made visible are thus unsatisfactory from this purpose. Rub-off lotto tickets are only slightly better as, rightfully or wrongfully, the user may assume that ticket distributor could rub off the coating, view the "concealed" message, and then sell the winning tickets to himself and sell the losing tickets to others after applying a similar coating to them. Thus, in the case of wagering products, the product ideally evidences the continuously concealed nature of the concealed message prior to the wagerer himself revealing the same—for example, by irreversibly revealing the concealed message once it is revealed.

In any case, the elaborateness of the procedure required to bring out the concealed message may itself prove a turnoff to the user who may object to having to scratch or rub off the coating from the rub-off lottery tickets, to retreat to the bathroom or kitchen or to obtain water, to locate a room with special lighting or a dark room in order to see a message. Thus the need remains for a novelty item having a gimmick which reveals a concealed message easily, simply, rapidly and without the need for a special environment (such as darkness, special light, fluid, or the like).

Accordingly, it is an object of the present invention to provide a novelty product having a concealed message which is easily, simply, and rapidly revealed without the need for a special environment.

Another object is to provide a wagering card having a concealed wager which is easily, simply, rapidly, and irreversibly revealed without the need for a special environment.

A further object to provide a promotional piece having a pair of advertisements, the first advertisement being initially visible and the second advertisement being initially concealed but easily, simply and rapidly revealed without the need for a special environment.

SUMMARY OF THE INVENTION

It has now been found that the above and related objects of the present invention are obtained in a wagering, promotional or novelty product having a concealed message. The product comprises a sheet having an outer surface, ink visibly disposed on the outer surface in a first pattern, and transparent film overlying at least a portion of the inked outer surface and secured to the ink on the outer surface portion in selected differentially adherent patterns, the first pattern being visible through the film. Removal of the film from the inked outer surface portion also removes the ink in one of the selected patterns to reveal a desired pattern of deinked outer surface and thereby render visible the previously concealed message.

In a preferred embodiment for wagering purposes, the sheet outer surface comprises a layer, the ink comprises a layer, and the film comprises a layer, the product additionally including a release coating layer defining a pattern of release coating, disposed intermediate a pair of the layers, and causing the differential adhesion of the selected differentially adherent patterns.

Preferably the first pattern comprises a message different from the concealed message. Where the product is a wagering card representing a given wager variable, the first pattern is not related to the variable, and the second pattern is related to the variable. Where the product is a promotional piece, the first pattern is a first advertisement, and the second pattern is a second advertisement different from the first advertisement.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
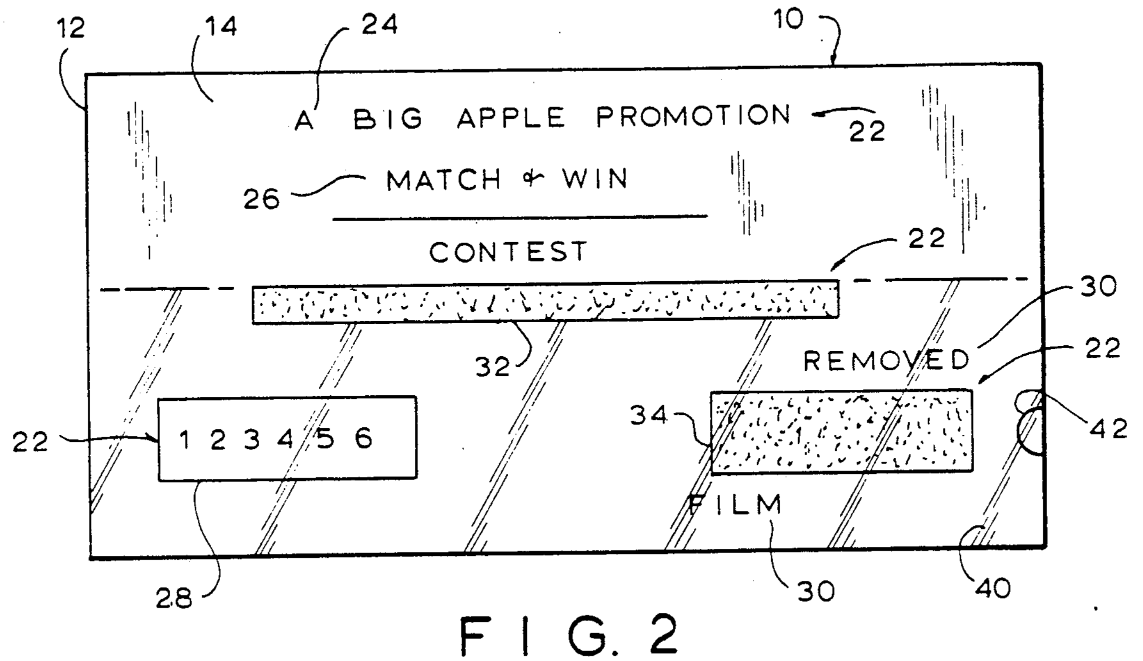
FIG. 1 is a top plan view of a product according to the present invention having a concealed message.
Figure 2:
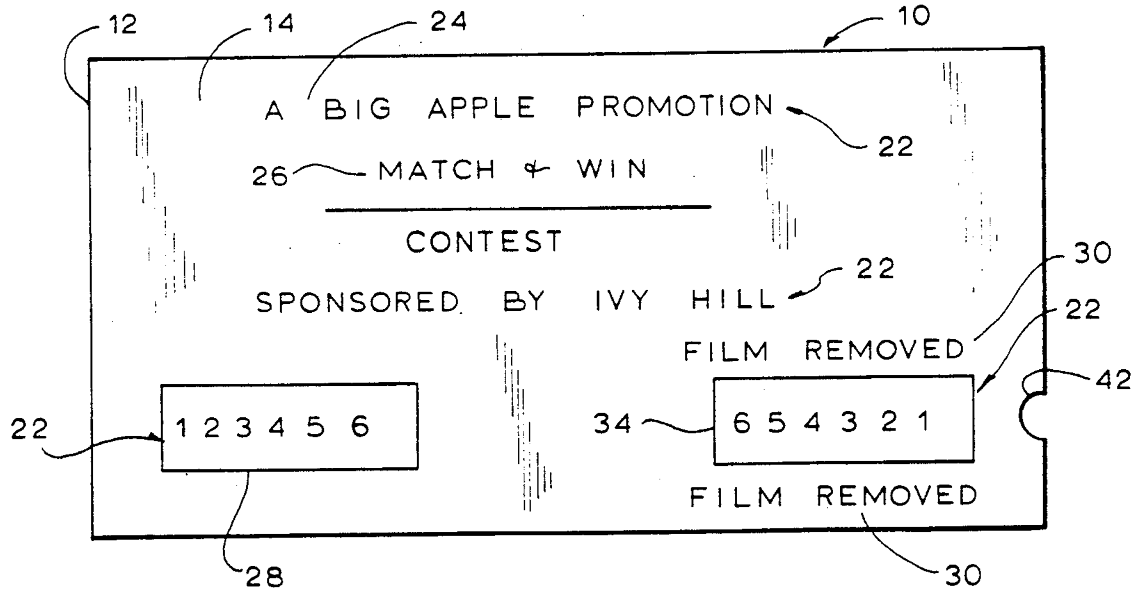
FIG. 2 is a top plan view of the product after removal of the transparent film therefrom to expose the heretofore concealed message on the sheet.

Referring now to the drawing, and in particular to FIG. 1 thereof, therein illustrated is a product having a concealed message according to the present invention, generally designated by the reference numeral 10. The illustrated product combines wagering, promotional and novelty aspects. Thus, it is a promotional device for the "BIG APPLE" generally and more specifically for Ivy Hill, as will become apparent hereinafter when the phrase "SPONSORED BY IVY HILL" appears on the face of the product. The product is a "match and win" type wagering product in which a given sequence of numbers is originally visible on the card on one side of the face (here, the left) and must be matched by a similar sequence of numbers on the other side of the card (here, the right side) in order to constitute a winning card. The sequence of numbers or digits to be matched is "123456" and, regretfully, as will become apparent hereinafter, this is a losing card as the concealed message is the sequence of digits "654321" —a non-match. The Product is also clearly a novelty product, and it has a concealed message ("SPONSORED BY IVY HILL") which is only made visible by the action of the user.

More particularly, the product 10 comprises a sheet 12 having an outer surface 14. The sheet 12 is preferably a thin, flat piece of paper, paper board (e.g., cardboard), or other materials. The configuration and dimensions of the sheet 12 are a matter of design choice. While the outer surface 14 herein illustrated is the top or front face of the sheet 12, the bottom or back face may be used in the same manner alternatively or in addition to the top or front face 14.

Ink 20 is visibly disposed on the outer surface 14 in a first pattern generally designated 22. The first pattern 22 includes various identificational, instructional, promotional or wagering information or data such as the name of the promotion 24 ("A BIG APPLE PROMOTION"), the type of wager 26 ("MATCH & WIN"), the winning sequence of digits 28 ("123456"), instructional matter 30 regarding use of the product ("REMOVE FILM") as well as obviously concealed message areas 32, 34. Clearly the identificational, promotional, instructional and wagering information and data may be varied without departing from the scope of the present invention. For example, letters, designs and the like may be used as the wager data 28, and the visible wagering data 28 may be positioned in vertical alignment with the concealed wagering data 34 so as to facilitate subsequent comparison.

A transparent film 40 overlies at least a portion of the outer surface 14, FIG. 1 illustrating the film 40 being disposed on the bottom half of the outer surface 14, although optionally it could be disposed in any desired configuration covering the concealed messages 32, 34. Where the first pattern 22 is covered by the transparent film 40, the first pattern 22 is visible through the film 40, as indicated with regard to areas 28–34. While the concealed message areas 32, 34 are illustrated as being a solid color, clearly they can be of an ornate or detailed design matching a similar ornate or detailed design occupying the remainder of the unused space of the product outer surface 14 or that portion thereof bearing transparent film 40. If desired, the ink pattern 22 initially visible in areas 32, 34 may contain additional wagering, promotional, instructional or other information.

A critical element of the present invention is that the transparent film 40 is secured to the ink 20 on the outer surface 14 in selected differentially adhered patterns. U.S. Pat. Application Ser. No. 366,172, filed June 14, 1989, describes a multitude of techniques for securing a transparent film to an ink on an outer surface in selected differentially adherent patterns, and any of the techniques described therein may be used for the purposes of the present invention. The substance of this application is hereby incorporated by reference as fully as if expressly set forth herein. Thus, in a first embodiment, the transparent film is secured to the ink in differentially adherent patterns through the use of an intermediate pattern of transparent heat-sealable coating followed by a uniform application of heat and pressure. (The pattern of heat-sealable coating may be applied either directly to the inked outer surface prior to application of the transparent film or directly to the transparent film prior to overlaying of the film on the inked outer surface.) In a second embodiment, the differentially adherent patterns between the transparent film and the inked outer surface are achieved by use of a uniform heat-sealable coating therebetween and the selected application of a pattern of heat and pressure to produce the desired pattern. In a third embodiment, the differentially adherent patterns between the transparent film and the inked outer surface are achieved exclusively through the selective application of heat and pressure without the use of a heat-sealable coating applied in either a pattern or uniform layer intermediate the transparent film and the inked outer surface. (These first three embodiments are also described in U.S. Pat. No. 4,718,553.) In the fourth embodiment, a uniform heat-sealable coating is applied and a uniform heat and pressure are applied, with the differentially adherent patterns being formed by a pattern of transparent release coating interposed between the ink layer and the heat-sealable coating layer in a first variation, between the heat-sealable coating layer and the transparent film in a second variation, and between the outer surface and the ink layer in a third variation.

While each of the techniques disclosed in these embodiments is useful in the practice of the present invention, when the product of the present invention is to be utilized for wagering purposes the fourth embodiment is preferred as providing superior concealment of the concealed message. Thus, in the preferred embodiment of the present invention, the sheet outer surface 14 comprises a first layer, the ink 20 comprises a second layer, and the transparent film 40 comprises a third layer, the product additionally including a release coating layer defining a pattern of transparent release coating 50 disposed intermediate a pair of the layers 14, 20, and 40 and causing the differential adhesion of the selected differentially adhered patterns. On the other hand, where the product is to be utilized for promotional or novelty purposes, where concealment of the concealed message is not as critical as in the wagering situation, the first embodiment is preferred as it is simpler and more economical.

Figure 3:
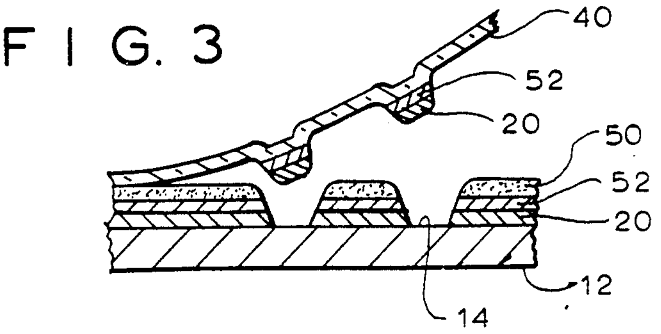
FIG. 3 is a sectional view of a preferred product of the present invention, to an enlarged scale, with the transparent film shown in the process of removal from the sheet.

Referring now to FIG. 3, therein illustrated is a product according to a preferred variant of the fourth embodiment wherein the transparent release coating 50 is disposed in a pattern intermediate an uniform layer of transparent heat-sealable coating 52 disposed on the inked outer surface of the sheet 12 and a transparent film 40. As the transparent film 40 is removed from the sheet 12, the ink 20 underlying the release coating 50 remains on the sheet outer surface 14 where it is prevented from bonding to the transparent film 40 by the release coating 50, while the ink 20 not underlying the release coating 50, and therefore bonded to the transparent film 40 by the heat-sealable coating 52 after a uniform application of heat and pressure, is removed with the transparent film 40.

Preferably, the sheet 12 is provided with an edge cut-out 42 (which may optionally be disposed on a corner) to facilitate an initial grasping of the transparent film 40 by the user in order to separate the film 40 from the sheet 12. Alternatively, the transparent film 40 may extend beyond an outer edge of the sheet 12 in order to Provide a tab (not shown) to facilitate separation of the film from the sheet.

Upon removal of the transparent film 40 from the sheet 12, the appearance of the outer surface 14 is unchanged in the areas not covered by the film 40 (e.g., areas 24, 26) and those areas where no change is intended—that is, where the ink 20 is more adherent to the sheet 12 than to the film 40 (e.g., areas 28). On the other hand, in those areas where a change is intended—that is, where the ink 20 is more adherent to the film 40 than to the sheet 12, removal of the transparent film 40 from the sheet 12 results in the appearance of the concealed message ("SPONSORED BY IVY HILL") in area 32, the concealed wager data ("654321") in area 34, and the conversion of the instructional information ("REMOVE FILM") in area 30 to an indication of the removal of the film ("FILM REMOVED FILM REMOVED") and thus that the concealed wager data is no longer "virgin".

While the transparent film 40 may be overwrapped about the sheet 12, if desired, for reasons of economy, ease of removal and the like, the transparent film preferably overlies only one face of the sheet—that is, the top or front face 14. Thus, the transparent film may be laminated to the sheet—for example, using a Talboy Coater Laminator operating at 250° F., 60 feet per minute, and 60 pounds per sq. inch, to laminate NRAM-V/33 film (available from FIAP U.S.A. of Wilmington, Del.) to 0.018 S.B.S. (solid bleached sulfate) paperboard (available from International Paper), lithographically printed with ultraviolet printing ink on a conventional sheet-fed offset lithographic Methle Printing Press and bearing a screen-printed pattern of a heat-sealable coating 9094-008 (available from Valspar Corporation of Pittsburgh, Penn. 15233) having added solvents and a defoaming agent.

It will be appreciated that the user has only to separate the transparent film 40 from the sheet 12 in order to reveal the concealed messages 32, 34 easily, simply and rapidly, without the need for a special environment involving fluids, darkness, exposure to light, heat or the like.

Figure 4:
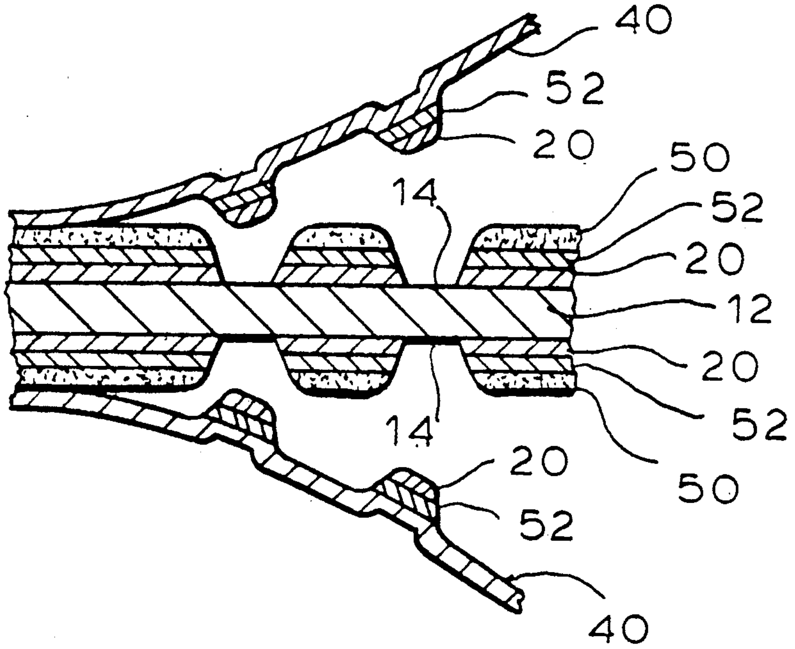
FIG. 4 is a sectional view of a product of the present invention having a concealed message on each side thereof, to an enlarged scale, with both transparent films being shown in the process of removal from the sheet.

Referring now to FIG. 4, therein illustrated is a preferred product according to the present invention wherein the bottom or back face is used in the same manner as the top or front face 14. The transparent film 490 on each side of the sheet 12 is illustrated in the process of being removed therefrom in order to reveal the concealed message areas on both sides. In such an embodiment, where there is a concealed message on both sides of the sheet 12, each face of the sheet may contain an appropriate notice (such as "Try the other side of the sheet for a second chance!") to indicate to the user that both transparent films should be removed from the sheet.

To summarize, the present invention Provides a product having a concealed message which is easily, simply and rapidly revealed without the need for a special environment. As a wagering card, the product irreversibly reveals the concealed wager once it is revealed, and as a promotional piece may include a pair of advertisements, one being initially visible and the second one being initially concealed but easily, simply and rapidly revealed without the need for a special environment.

Now that the preferred embodiments of the present invention have been shown and described in detail, various modifications and improvements thereon will become readily apparent to those skilled in the art. Accordingly, the appended claims are to be construed broadly and in a manner consistent with the spirit and scope of the invention described herein.

I claim:

1. A sheet product having a concealed message suitable for wagering, promotional and novelty applications, comprising:

(A) a sheet having a pair of substantially planar opposed outer surfaces;

(B) ink visibly disposed on one of said outer surfaces in a first pattern; and (C) a transparent film overlying at least a portion of said inked outer surface and not appreciably overlying the other of said outer surfaces, said film being secured to said ink on said outer surface portion in selected differentially adherent patterns, said first pattern being visible through said film; and (D) a release coating layer defining a pattern of release coating, disposed intermediate a pair of said layers (A), (B) and (C), and causing the differential adhesion of said selected differentially adherent patterns;

whereby removal of said film from said inked outer surface portion also removes said ink in one of said selected patterns to reveal a desired second pattern of deinked outer surface different from said first pattern and thereby render visible the previously concealed message.

2. The product of claim 1 wherein said release coating layer is intermediate layers (B) and (C), and additionally including a transparent heat-sealable coating layer uniformly disposed intermediate said ink layer and said film layer, said heat-sealable coating layer being bonded to an underlying portion of said ink layer and an overlying portion of said film layer.

3. The product of claim 1 wherein said first pattern comprises a message different from said concealed message.

4. The product of claim 1 wherein said product is a wagering card representing a given wager variable, said first pattern is not related to said variable, and said second pattern differs from said first pattern and is related to said variable.

5. The product of claim 1 wherein said product is a promotional piece, said first pattern is a first advertisement, and said second pattern is a second advertisement different from said first advertisement.

6. The product of claim 1 additionally including a transparent heat-sealable coating layer uniformly disposed intermediate said ink layer and the adjacent overlying one of said film layer and said release coating layer.

7. The product of claim 1 wherein ink is visibly disposed on each of said outer surfaces in a first pattern, a first transparent film overlies at least a portion of one of said inked outer surfaces without appreciably overlying the other of said outer surfaces, and a second transparent film overlies at least a portion of the other of said inked outer surfaces without appreciably overlying the one of said outer surfaces.

* * * * *